United States Patent
Magadevan

(10) Patent No.: US 11,412,558 B2
(45) Date of Patent: Aug. 9, 2022

(54) IOT MODULE ADAPTOR

(71) Applicant: T-Mobile USA, Inc., Bellevue, WA (US)

(72) Inventor: Poornima Magadevan, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 8 days.

(21) Appl. No.: 16/425,781

(22) Filed: May 29, 2019

(65) Prior Publication Data
US 2019/0373649 A1    Dec. 5, 2019

Related U.S. Application Data

(60) Provisional application No. 62/679,661, filed on Jun. 1, 2018.

(51) Int. Cl.
| | |
|---|---|
| *H04W 76/11* | (2018.01) |
| *H04W 76/14* | (2018.01) |
| *H04W 92/18* | (2009.01) |
| *H04W 4/70* | (2018.01) |
| *H04L 67/12* | (2022.01) |

(52) U.S. Cl.
CPC ............ *H04W 76/11* (2018.02); *H04W 4/70* (2018.02); *H04W 76/14* (2018.02); *H04W 92/18* (2013.01); *H04L 67/12* (2013.01)

(58) Field of Classification Search
CPC .......... G01S 19/14; G01S 19/24; G01S 19/26; G01S 19/45; G10L 2015/223; G16Y 30/00
See application file for complete search history.

(56) References Cited

U.S. PATENT DOCUMENTS

| | | | |
|---|---|---|---|
| 2014/0074481 A1* | 3/2014 | Newman | G10L 25/51 704/275 |
| 2016/0197772 A1 | 7/2016 | Britt et al. | |
| 2017/0126809 A1 | 5/2017 | Chen et al. | |

(Continued)

OTHER PUBLICATIONS

International Application No. PCT/US2019/034928, International Search Report and Written Opinion dated Sep. 18, 2019, 12 pages.
(Continued)

*Primary Examiner* — Ayaz R Sheikh
*Assistant Examiner* — Debebe A Asefa
(74) *Attorney, Agent, or Firm* — Han Santos, PLLC

(57) ABSTRACT

An Internet of Things (IoT) module adaptor application may be used to provide operational compatibility between a device application of an IoT device and multiple IoT modules. The IoT module adaptor application may detect that an IoT module is connected to the IoT device, in which the IoT module provides a network connectivity functionality to the IoT device. An identity of the IoT module is ascertained by the IoT module adaptor application based on identification information provided by the IoT module. The IoT module adaptor application may determine a specific combination of at least one of one or more ATtention (AT) commands or one or more application program interfaces (APIs) as stored in a software library that corresponds to the identity of the IoT module. Subsequently, the IoT module adaptor application may provide a device application of the IoT device with access to the specific combination for the device application to interact with the IoT module.

20 Claims, 7 Drawing Sheets

(56) References Cited

U.S. PATENT DOCUMENTS

| | | | |
|---|---|---|---|
| 2017/0244814 A1 | 8/2017 | Yin et al. | |
| 2017/0270563 A1* | 9/2017 | Soni | H04L 67/02 |
| 2018/0146378 A1* | 5/2018 | Christmas | G06F 21/6209 |
| 2021/0037355 A1* | 2/2021 | Brown | H04W 4/20 |

OTHER PUBLICATIONS

Introduction to AT Commands [online]. Developer's Home, 2020 [retrieved on Sep. 24, 2020], Retrieved from the Internet >https://www.developershome.com/sms/atCommandsIntro.asp>.

* cited by examiner

IOT MODULE ADAPTOR

CROSS-REFERENCE TO RELATED PATENT APPLICATION

This application claims priority to U.S. Provisional Patent Application No. 62/679,661, filed on Jun. 1, 2018, entitled "IoT Module Adaptor," which is hereby incorporated by reference in its entirety.

BACKGROUND

Internet of things (IoT) modules are network communication devices that can be attached to or embedded in user devices or machines to provide such devices or machines with the ability to connect to a wireless carrier network for the purpose of sending and receiving data. For example, a sensor may use an IoT module to connect to a backend network. In many instances, an IoT module may contain the hardware and software components found in a mobile telecommunication device. For example, the IoT module may include a modem/chipset, as well as an embedded or removable subscriber identity module (SIM). However, an IoT module may lack user interface components such as a display or keypad, as such components may not be necessary for the role that the IoT module performs. In many instances, an IoT module may be configured to provide continuous network connectivity to the attached device or machine without any input from a user.

Currently, there are a variety of IoT modules in the marketplace, and IoT modules are manufactured by a variety of manufacturers, such as U-Blox, Sierra, Quectel, and so forth. Many IoT module manufacturers use a set of ATtention (AT) commands that are unique to their IoT modules. Further, many IoT module manufacturers also provide unique sets of application program interfaces (APIs) for communicating with the underlying modems of their IoT modules.

Such IoT module specific AT commands and APIs may reduce the interoperability of a specific device or machine with multiple IoT modules from different manufacturers. Further, as the specific AT commands and APIs of an IoT module are changed over time, the software in the device or machine that is connected to the IoT module may need to be updated to maintain compatibility with the IoT module. Such complications may slow down the adoption of new IoT technologies.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
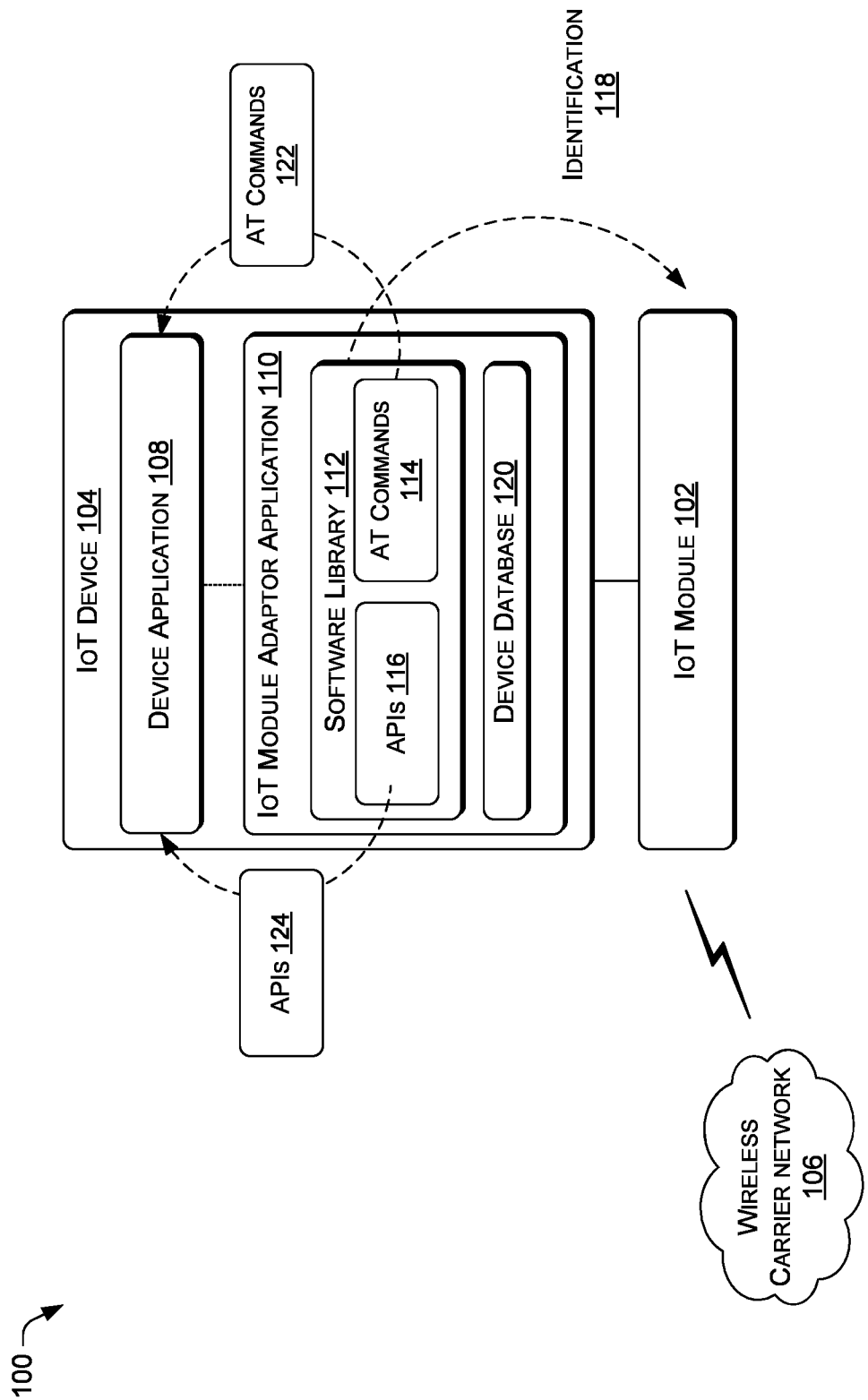
FIG. 1 illustrates an example environment that enables the use of an Internet of things (IoT) module adaptor application to provide operational compatibility between a device application of an IoT device and an IoT module.

This disclosure is directed to techniques for using a software Internet of things (IoT) module adaptor application to provide operational compatibility between a device application of an IoT device and multiple IoT modules. The IoT module adaptor application may include a software library and associated application components. The IoT module adaptor application may be installed on a device or machine that uses an IoT module to connect to a wireless carrier network. As used herein, the device or machine that uses the IoT module is referred to as an IoT device. The software library may support standard coding language options that are used in various IoT devices, such as C, Java, Python, etc. The software library may contain sets of different ATtention (AT) commands and/or application program interfaces (APIs) for IoT modules of different manufacturers and/or types. For example, the software library may contain a first combination of AT commands and/or APIs for an IoT module of a first type from a first manufacturer. Likewise, the software library may contain a second combination of AT commands and/or APIs for an IoT module of a second type from the first manufacturer. Further, the software library may contain a third combination of AT commands and/or APIs for an IoT module from a third manufacturer, and so on and so forth. In some instances, different combinations may share one or more identical AT commands and/or one or more identical APIs. Once a particular IoT module of a specific manufacturer/type is detected by the IoT module adaptor application, the IoT module adaptor application may automatically recognize the particular IoT module. Further, the IoT module adaptor application may provide the specific combination of AT commands and/or APIs that correspond to the particular IoT module from the software library for use by a device application of the IoT device. The device application may be any application installed on the IoT device whose ability to perform a task or a function is dependent on having access to the communication services provided by the wireless carrier network. Accordingly, the device application of the IoT device may use the specific combination of AT commands and/or APIs to interface with the particular IoT module, such that the device application is able to use the wireless carrier network for communication.

Furthermore, additional AT commands and/or APIs may be pushed to the software library on an IoT device from a networked backend server. The additional AT commands and/or APIs may be for a new IoT module. Alternatively, the additional AT commands and/or APIs may be updates for a current IoT module that replace existing AT commands and/or APIs in the software library. In various embodiments, such updates to the software library may be performed as an over-the-air (OTA) update to the IoT device using a wireless carrier network while the IoT device is in operation. The networked backend server may be a server that is operated by a third-party service provider, the wireless carrier network, or a partnership of the third-party service provider and the wireless carrier network.

The use of an IoT module adaptor application to provide operational compatibility between a device application of an IoT device and multiple IoT modules may offer multiple benefits. The benefits may include interoperability for changing the IoT modules that are used by IoT devices, quicker adoption of new IoT module solutions when new IoT modules, standards, or specifications are put forth, and reduction of the time to market of new IoT modules. The techniques described herein may be implemented in a number of ways. Example implementations are provided below with reference to the following FIGS. 1-7.

Example Environment

FIG. 1 illustrates an example environment 100 that enables the use of an Internet of things (IoT) module adaptor application to provide operational compatibility between a device application of an IoT device and a connected IoT module. The IoT module 102 may contain the hardware and software components found in a mobile telecommunication device. For example, the IoT module 102 may include a modem/chipset, as well as an embedded or removable subscriber identity module (SIM). However, the IoT module 102 may lack user interface components such as a display or keypad. In many instances, the IoT module 102 may be configured to provide a network connectivity functionality to the attached device or machine without any input from a user. The IoT module 102 may be electrically coupled to the IoT device 104. In some instances, the coupling of the IoT module 102 to the IoT device 104 may be achieved via a detachable electrical interface (e.g., male and female mating connectors). The IoT device 104 may be a device that uses the IoT module 102 to connect to a wireless carrier network 106, such that the IoT device 104 may use the wireless carrier network 106 to communicate with a network service. For example, the IoT device 104 may be a sensor that uses the wireless carrier network 106 to exchange data with a backend server.

The IoT device 104 may be equipped with a device application 108 and an IoT module adaptor application 110. The IoT module adaptor application 110 may include routines, program instructions, objects, and/or data structures that are executed by processors to perform particular tasks. Further, the IoT module adaptor application 110 may have a built-in software library 112. The software library 112 may support standard coding language options that are used in various IoT devices, such as C, Java, Python, etc. The software library 112 may contain sets of different ATtention (AT) commands 114 and/or APIs 116 for IoT modules of different manufacturers and/or types (e.g., device models). For example, the software library 112 may contain a first combination of AT commands and/or APIs for an IoT module of a first type from a first manufacturer. Likewise, the software library 112 may contain a second combination of AT commands and/or APIs for an IoT module of a second type from a second manufacturer. Further, the software library 112 may contain a third combination of AT commands and/or APIs for an IoT module from a third manufacturer, and so on and so forth. In some instances, different combinations may share one or more identical AT commands and/or one or more identical APIs.

The ability of the device application 108 to perform a task or a function may be dependent on having access to the communication services provided by the wireless carrier network. Accordingly, the device application 108 may use the specific combination of AT commands and/or APIs to interface with a particular IoT module, such as the IoT module 102, so that the device application 108 is able to use the wireless carrier network 106 for communication.

The wireless carrier network 106 may provide a wide range of mobile communication services, as well as ancillary services and features, to subscribers and associated mobile device users. The wireless carrier network 106 may be operated by a mobile network operator (MNO). In various embodiments, the wireless carrier network 106 may provide wireless communication between multiple user devices. Further, the wireless carrier network 106 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 106 may be implemented using multiple interconnected networks. In various embodiments, the wireless carrier network 106 may include multiple Radio Access Networks (RANs). The RANs may be connected to each other via regional ground networks. In turn, the regional ground networks may be connected to a core network of the wireless carrier network 106 by a wide area network (WAN). Each regional portion of the wireless carrier network 106 may include one or more RANs and a regional circuit and/or packet switched network and associated signaling network facilities. The wireless carrier network 106 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless carrier network 106 may be accessed via wired or wireless local area networks (LANs). For example, a wireless local area network may be a network that is established using Wi-Fi or Bluetooth standards and hardware.

In various embodiments, the IoT module adaptor application 110 may detect that the IoT module 102 is connected to the IoT device 104 and perform identification 118 of the IoT module 102. The IoT module adaptor application 110 may detect the presence of the IoT module 102 when the IoT device 104 is initially powered up, or when the IoT module 102 is electrically coupled to the IoT device 104 following the initial power up. In some instances, the IoT module adaptor application 110 may identify the IoT module 102 by sending an identification query to the IoT module 102 requesting that the IoT module 102 provide identification information. In turn, the IoT module 102 may return identification information to the IoT module adaptor application 110. In other instances, the IoT module 102 may automatically send its identification information to the IoT module adaptor application 110 when the IoT device 104 initially provides power to the IoT module 102. In various embodiments, the identification information may include a unique identifier of the IoT module 102, an identity of the IoT device manufacturer, a device model of the IoT module, a version identifier of the IoT module, and/or so forth. For example, the unique identifier of the IoT module 102 may include a media access control (MAC) address, an integrated circuit card identifier (ICCID), an electronic serial number (ESN), and/or other identification information.

Subsequently, the IoT module adaptor application 110 may use a device database 120 to correlate the identification information of the IoT module 102 to a specific combination of one or more AT commands 122 and/or one or more APIs 124 that are stored in the software library 112. For example, the device database 120 may include entries that match individual IoT modules of different types (e.g., different device manufacturers, different device models, different model versions, and/or so forth) to corresponding combinations of one or more specific AT commands and/or one or more specific APIs.

Accordingly, the IoT module adaptor application 110 may provide the specific combination for use by the device application 108. For example, the IoT module adaptor application 110 may retrieve the specific combination of the one or more AT commands 122 and/or the one or more APIs 124 from the software library 112. Subsequently, the IoT module adaptor application 110 may load the specific combination into a designated directory, file, or memory location for access by the device application 108. Alternatively, the IoT module adaptor application 110 may load a pointer (e.g., a link, a path, an address, and/or so forth) for each AT command or API in the specific combination of one or more AT commands 122 and/or one or more APIs 124 into the designated directory, file, or particular memory location for access by the device application 108.

Figure 2:
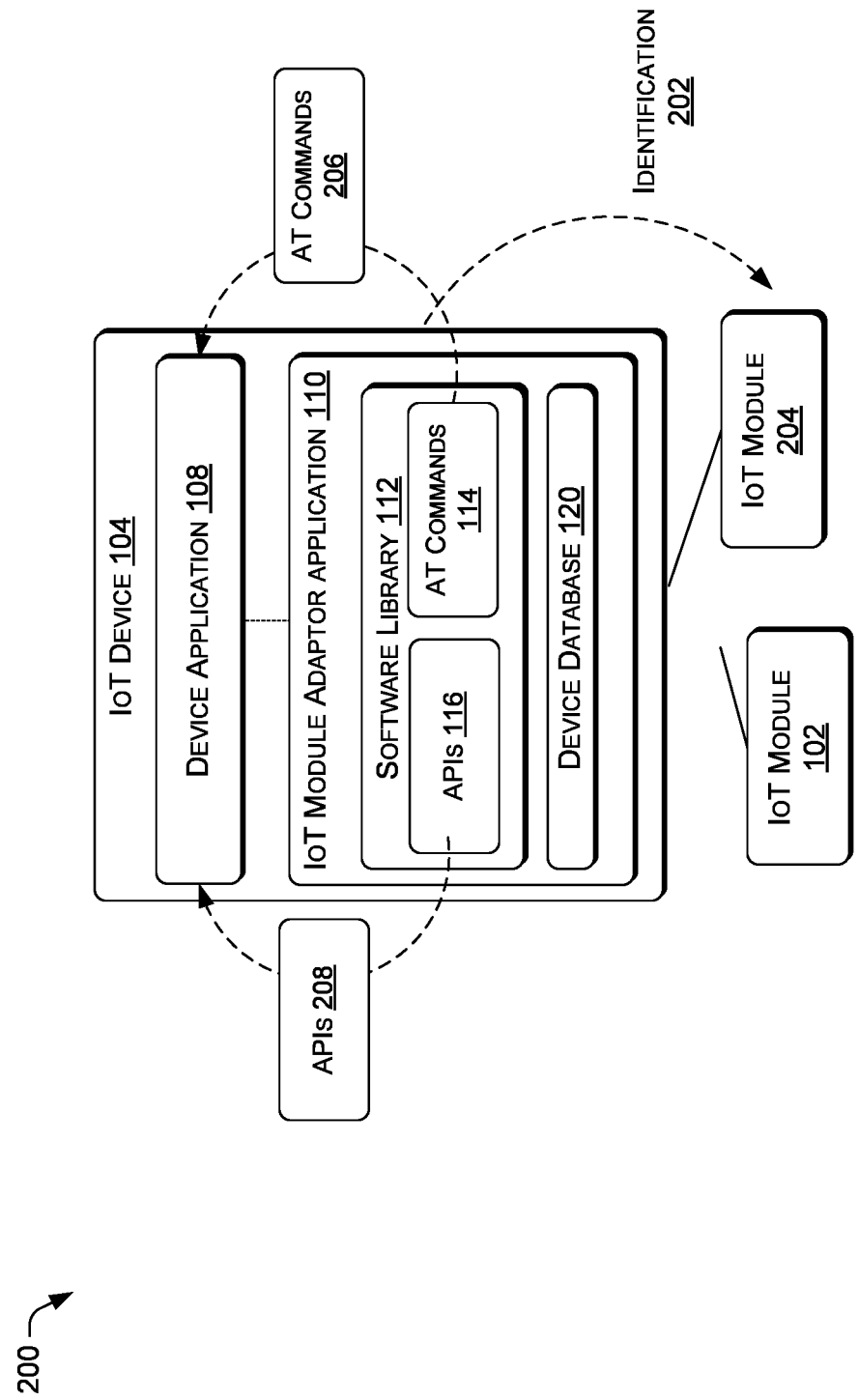
FIG. 2 illustrates an additional example environment that enables the use of an IoT module adaptor application to provide operational compatibility between a device application of an IoT device and an IoT module.

FIG. 2 illustrates an additional example environment 200 that enables the use of an IoT module adaptor application to provide operational compatibility between a device application of an IoT device and an IoT module when an existing IoT module connected to the IoT device is replaced with a new IoT Module.

In various embodiments, the IoT module 102 may be initially connected to the IoT device 104. Subsequently, the IoT module adaptor application 110 may detect that the IoT module 102 is electrically decoupled from the IoT device 104 and an IoT module is electrically coupled to the IoT device 104. For example, the IoT module adaptor application 110 may sense the electrical coupling and decoupling of the IoT modules based on changes in electrical current and/or voltage load resulting from the coupling and decoupling. At this point, the IoT module being coupled to the IoT device 104 may be the IoT module 102 or some other IoT module. Accordingly, having detected the presence of the coupled IoT module, the IoT module adaptor application 110 may perform identification 202 of the newly coupled IoT module. In some instances, the IoT module adaptor application 110 may make the identification by sending an identification query to the IoT module to request that the IoT module provide identification information. In turn, the IoT module may return identification information to the IoT module adaptor application 110. Alternatively, the IoT module adaptor application 110 may be configured to wait for the IoT module to automatically send its identification information to the IoT module adaptor application 110. In various embodiments, the identification information may include a unique identifier of the IoT module, data on the device manufacturer and device model of the IoT module, and/or so forth. For example, the unique identifier of the IoT module may include a media access control (MAC) address, an integrated circuit card identifier (ICCID), an electronic serial number (ESN), a device manufacturer/model identifier, and/or other identification information.

The IoT module adaptor application 110 may determine, based on the identification information of the IoT module, whether the IoT module was the last IoT module to connect to the IoT device 104 (e.g., the IoT module 102). For example, the IoT module adaptor application 110 may have an access log that tracks the identification information, device manufacturer information, and device model information for a predetermined number of IoT modules that previously connected to the IoT device 104. Accordingly, the IoT module adaptor application 110 may compare the identification information to the access log to make the determination.

Thus, if the IoT module adaptor application 110 determines that the IoT module is one that was previously electrically coupled to the IoT device 104, or identical in module type (e.g., identical device manufacturer, identical device model, and in some instances, identical version number) to the previously electrically coupled IoT module, the IoT module adaptor application 110 may take no further action. However, if the IoT module adaptor application 110 determines that the IoT module (e.g., IoT module 204) is not a previous IoT module that is electrically coupled to the IoT device 104 or that the IoT module is different in manufacturer or model from the previous IoT module electrically coupled to the IoT device 104, the IoT module adaptor application 110 may use the device database 120 to correlate the identification information of the IoT module 204 to a specific combination of one or more AT commands 206 and/or one or more APIs 208 that are stored in the software library 112. Subsequently, the IoT module adaptor application 110 may provide the specific combination for use by the device application 108. For example, the IoT module adaptor application 110 may retrieve the specific combination of one or more AT commands 206 and/or one or more APIs 208 from the software library 112. Subsequently, the IoT module adaptor application 110 may load the specific combination into a designated directory, file, or memory location for access by the device application 108. Alternatively, the IoT module adaptor application 110 may load pointers to the specific combination of one or more AT commands 206 and/or one or more APIs 208 into the designated directory, file, or particular memory location for access by the device application 108.

However, in alternative embodiments, the IoT module adaptor application 110 may forego the use of the access log. Instead, when the IoT module adaptor application 110 detects that an existing IoT module is electrically decoupled from the IoT device 104 and a new IoT module is electrically coupled to the IoT device 104, the IoT module adaptor application 110 may be configured to simply perform identification of the new IoT module and the loading of a particular combination or pointers that correspond to the new IoT module. This means the loading may be performed even if the new IoT module is the existing IoT module or identical in module type to the existing IoT module.

Example Update Service

Figure 3:
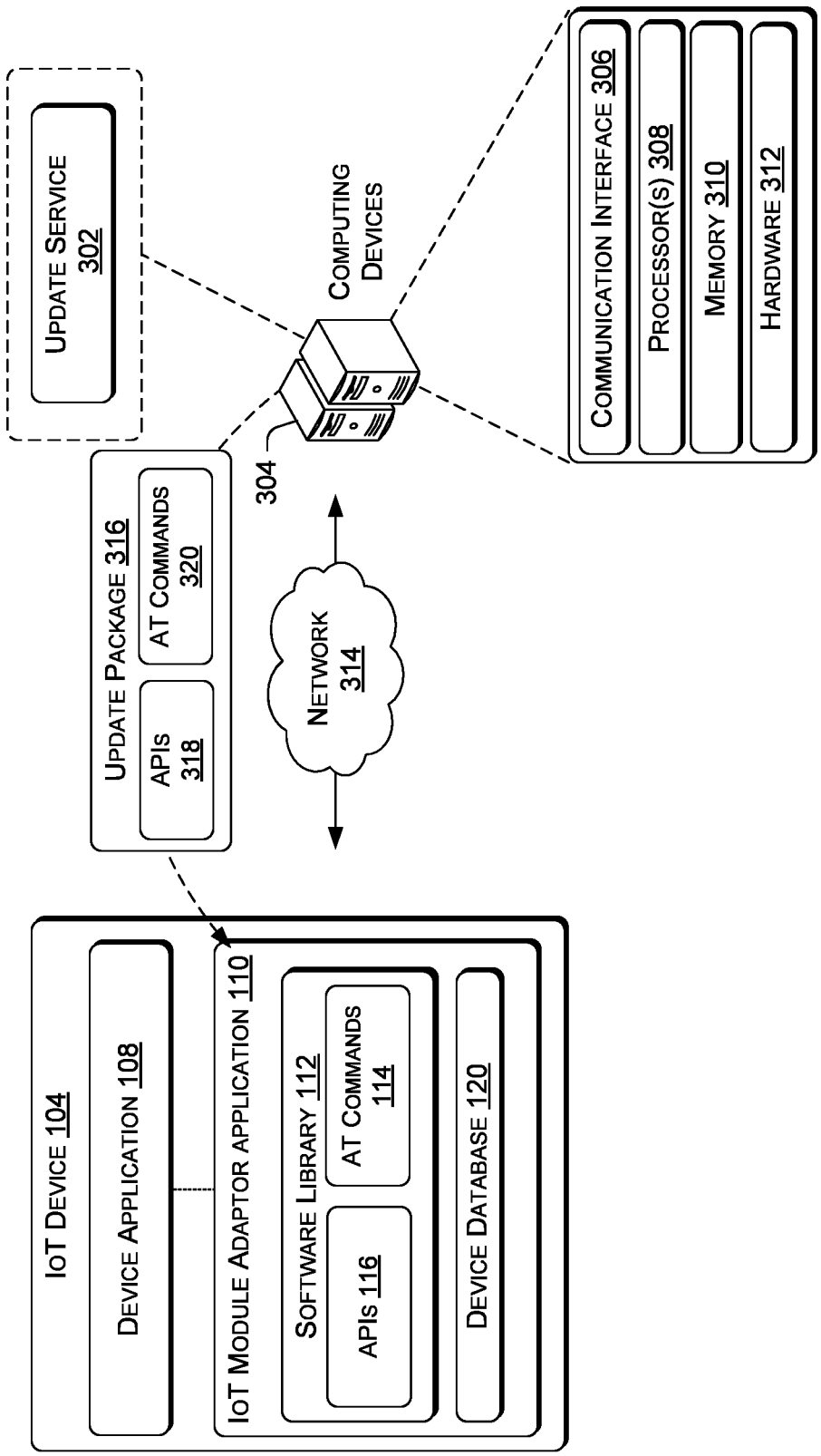
FIG. 3 is a block diagram showing various components of one or more illustrative computing devices that support the OTA update of a software library used by an IoT module adapter on an IoT device.

FIG. 3 is a block diagram showing various components of one or more illustrative computing devices that support the OTA update of a software library used by an IoT module adapter on an IoT device. In various embodiments, the IoT module adaptor application 110 of the IoT device 104 may send a query to an update service 302 to determine whether an update package is available for an IoT module. The update package may include one or more AT commands and/or one or more APIs for an IoT module. The update service 302 may be hosted by one or more computing device 304.

The computing devices 304 may include a communication interface 306, one or more processors 308, memory 310, and hardware 312. The communication interface 306 may include wireless and/or wired communication components that enable the computing devices 304 to transmit data to and receive data from other networked devices. The hardware 312 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 304 or components thereof may be virtual computing devices in the form of virtual machines or software containers that are hosted in a computing cloud.

In various embodiments, the update service 302 may be provided by a manufacturer of an IoT module, or alternatively a group of manufacturers of IoT modules. In some instances, the IoT module adaptor application 110 may send a query that includes the identification information of an IoT module, as well as version information for one or more AT commands and one or more APIs of the IoT module as stored in the software library 112. The IoT module adaptor application 110 may communicate with the update service 302 via a network 314. The network 314 may include the wireless carrier network 106, a local area network (LAN), a wide area network (WAN), or other networks. In turn, the update service 302 may use the version information to determine whether newer versions of one or more AT commands and one or more APIs are available to download for the IoT module. Accordingly, if one or more new versions are available, the update service 302 may compile an update package that includes the new versions for transmission to the IoT device 104. For example, an update package 316 may include one or more APIs 318 and/or one or more APIs 320. Otherwise, the update service 302 may return an indication that no update package is available to the IoT module adaptor application 110. In such instances, the IoT module adaptor application 110 may periodically send such queries to keep the software library up-to-date.

In other instances, the IoT module adaptor application 110 may send a query for an update package when an unknown IoT module is coupled to the IoT device 104. For example, the IoT module adaptor application 110 may determine that an IoT module is unknown when the identification information of the IoT module is not found in the device database 120, or the device database 120 does not indicate that the identification information of the IoT module correlates to any APIs or AT commands. In such instances, the IoT module adaptor application 110 may send a query that includes the identification information of the unknown IoT module to the update service 302 and a request for an available update package. In turn, the update service 302 may return an update package with the latest APIs and/or AT commands for the unknown IoT module.

In other embodiments, the update service 302 may periodically poll the IoT module adaptor application 110 of the IoT device 104 for the IoT module identification information and the version information of APIs and AT commands that are stored in the software library 112 for one or more IoT modules. In turn, the IoT module adaptor application 110 may send the requested information to the update service 302. Accordingly, the update service 302 may generate an update package that includes the latest versions of one or more APIs and/or one or more AT commands for delivery to the IoT device 104.

The update service 302 may use various transfer protocols to send an update package to the IoT module adaptor application 110, such as Secure Copy Protocol (SCP), Secure File Transfer Protocol (SFTP), HTTP Secure (HTTPS), and/or so forth. The update package may include APIs and/or AT commands for a new IoT module. Alternatively, the update package may include updated APIs and/or AT commands that replace existing APIs and/or AT commands in the software library 112 for an existing IoT module. An existing IoT module is an IoT module that is known to the IoT module adaptor application 110, i.e., the identification information of the IoT module is located in the device database 120 and the database indicates that the IoT module correlates to one or more AT commands and/or one or more APIs. In various embodiments, the update service 302 of an IoT module manufacturer may use a network 314 to transmit the update package as an OTA update to the IoT device 104. Once an update package is received by the IoT device 104, the IoT module adaptor application 110 may store the update package in the software library 112. For example, when the update package is for a new IoT module that was previously unknown, the IoT module adaptor application 110 may simply store the one or more APIs and/or the one or more AT commands from the update package in the software library 112. However, when the update package is for an existing IoT module, the IoT module adaptor application 110 may store the update package such that one or more existing APIs and/or one or more existing AT commands in the software library 112 are replaced with the one or more corresponding APIs and/or one or more AT commands from the update package. In some embodiments, the storage of the update package in the software library 112 may involve recompiling the software library 112 to include the one or more APIs and/or one or more AT commands of the update package. Furthermore, the IoT module adaptor application 110 may further update the device database 120 with the version information of the one or more APIs and/or one or more AT commands included in the update package.

Example IoT Device Components

Figure 4:
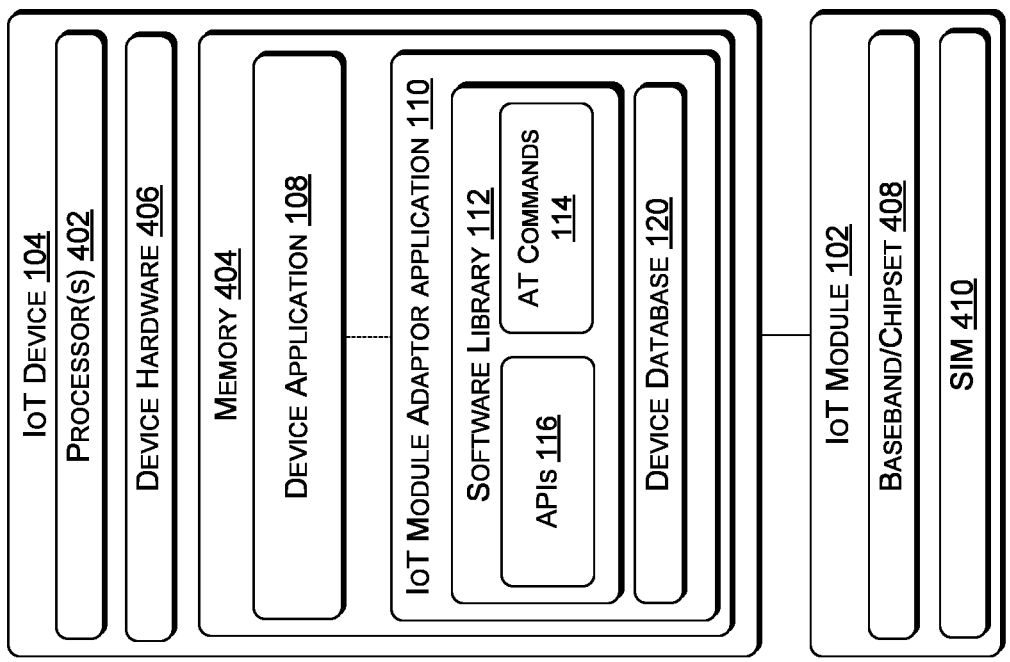
FIG. 4 is a block diagram showing various components of an illustrative IoT device equipped with an IoT module adaptor application that provides operational compatibility with a coupled IoT module.

FIG. 4 is a block diagram showing various components of an illustrative IoT device equipped with an IoT module adaptor application that provides operational compatibility with a coupled IoT module. The IoT device 104 may include one or more processors 402, memory 404, and device hardware 406. The memory 404 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In various embodiments, the IoT device 104 may be equipped with additional device hardware. The device hardware 406 may include signal converters, hardware decoders and encoders, graphics processors, and/or the like that enable the IoT device 104 to execute applications.

The one or more processors 402 and the memory 404 of the IoT device 104 may implement one or more device applications, such as the device application 108, and the IoT module adaptor application 110. Such software may include routines, program instructions, objects, and/or data structures that are executed by the processors 402 to perform particular tasks or implement particular abstract data types. The IoT module adaptor application 110 may include a software library 112 that stores the AT commands 114 and the APIs 116.

In some embodiments, the IoT device 104 may be equipped with one or more sensors and/or a user interface. The sensors may include a proximity sensor, a compass, an accelerometer, biometric sensors, cameras, and/or a global positioning system (GPS) sensor, among other appropriate sensors. The proximity sensor may detect the movement of objects that are proximate to the IoT device 104. The compass, the accelerometer, and the GPS sensor may detect orientation, movement, and geolocation of the IoT device 104. The cameras may capture images of the environment around the IoT device 104. The user interface may enable a user to provide inputs and receive outputs from the IoT device 104. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The IoT module 102 that is coupled to the IoT device 104 may contain the hardware and software components that provide telecommunication capabilities. For example, the IoT module may include a modem/chipset 408, an embedded or removable SIM 410, and/or other hardware components.

Example Processes

Figure 5:
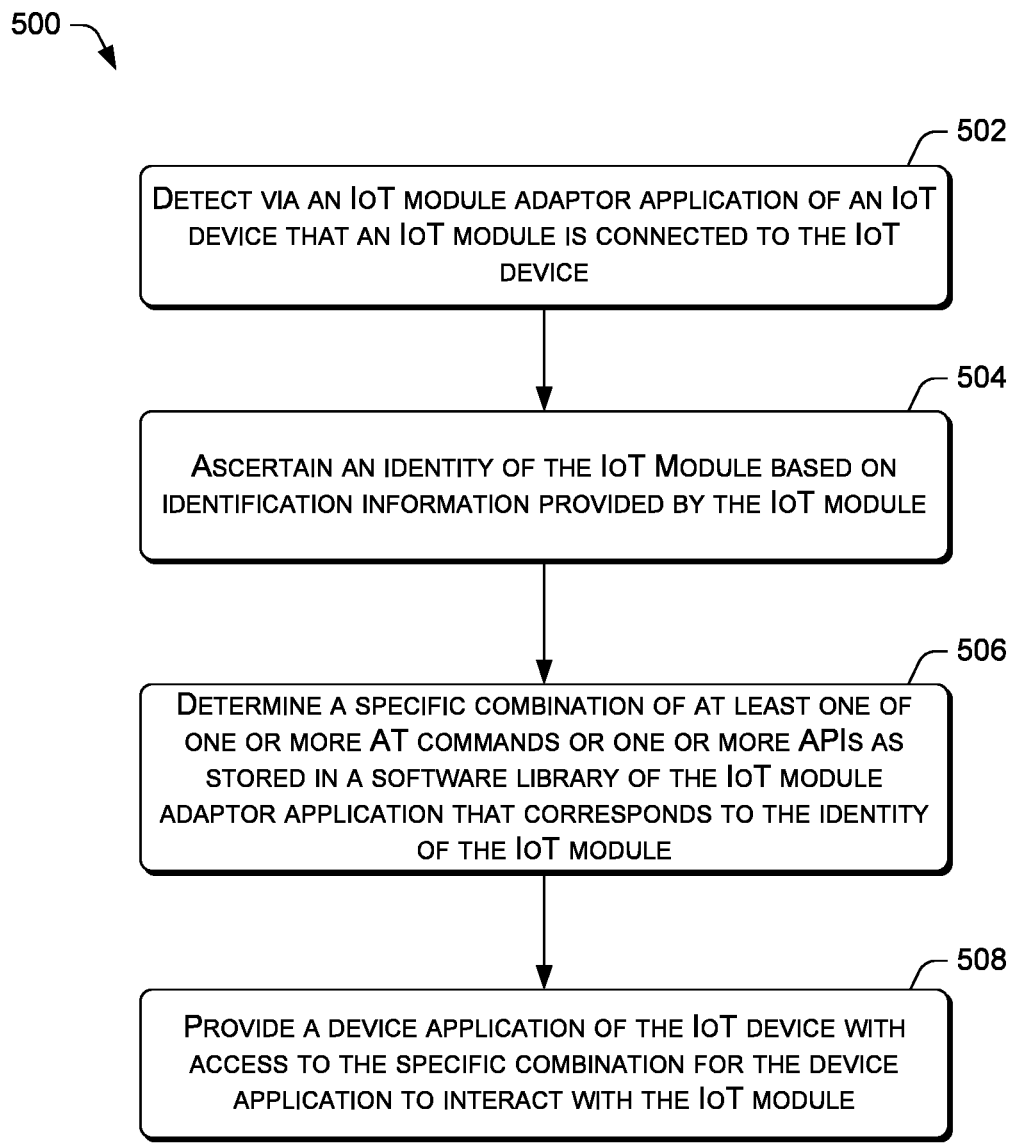
FIG. 5 is a flow diagram of an example process for providing a device application installed on an IoT device with access to a detected IoT module.
Figure 6:
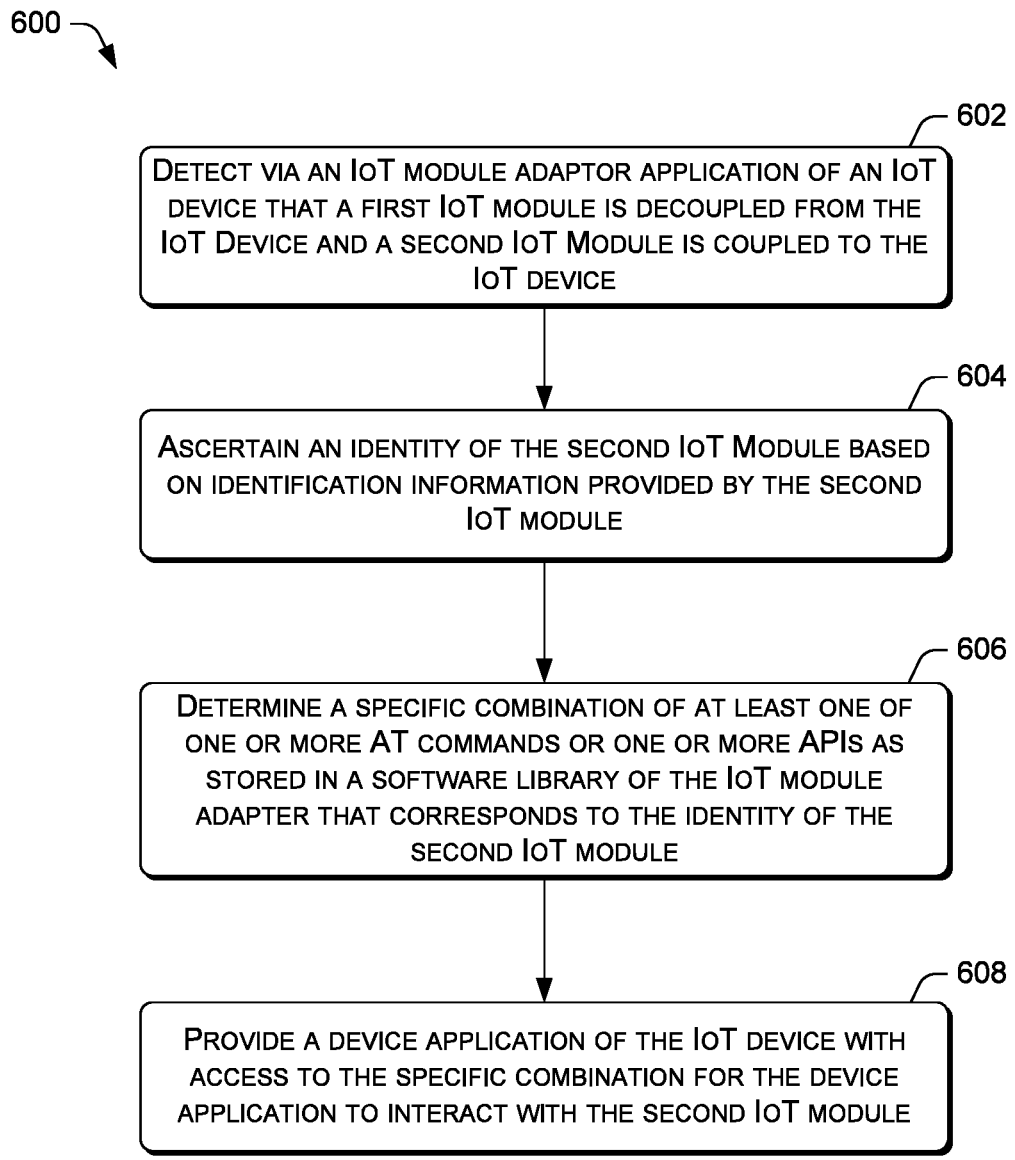
FIG. 6 is a flow diagram of an example process for providing a device application installed on an IoT device with access to a detected IoT module when an existing IoT module connected to the IoT module is replaced with the detected IoT module.
Figure 7:
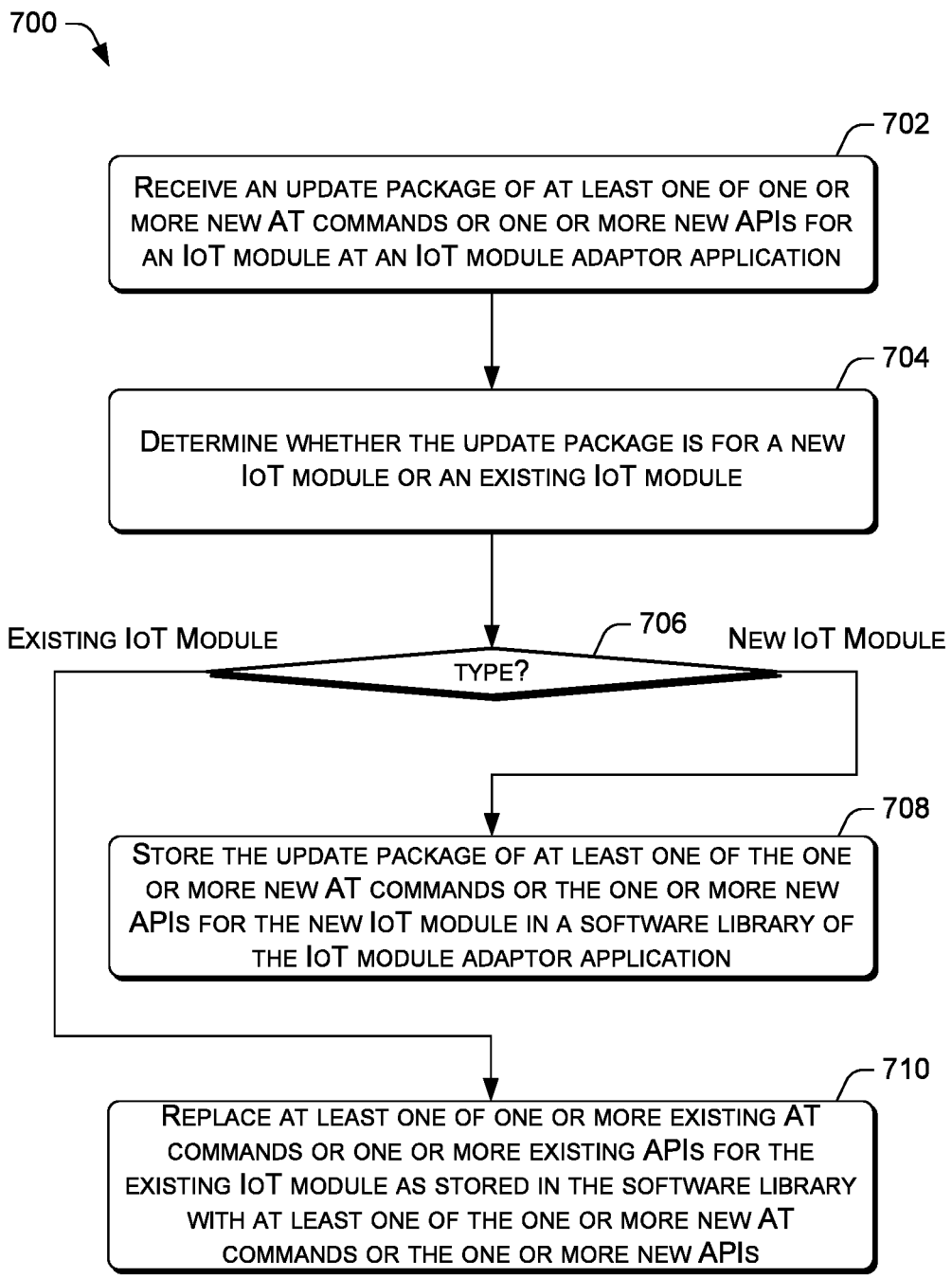
FIG. 7 is a flow diagram of an example process for a software library of an IoT module adaptor application to be updated by an update service.

FIGS. 5-7 present illustrative processes 500-700 that enable the use of an IoT module adaptor application to provide operational compatibility between a device application of an IoT device and an IoT module. Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-700 are described with reference to the environment 100 of FIG. 1.

FIG. 5 is a flow diagram of an example process 500 for providing a device application installed on an IoT device with access to a detected IoT module. At block 502, the IoT module adaptor application 110 of the IoT device 104 may detect that the IoT module is connected to the IoT device 104. In some instances, the IoT module adaptor application 110 may detect the IoT module when the IoT device 104 initially powers up. In other instances, the IoT module adaptor application 110 may detect the IoT module when the IoT module is electrically coupled to the IoT device 104.

At block 504, the IoT module adaptor application 110 may ascertain an identity of the IoT module based on identification information provided by the IoT module. In some instances, the IoT module adaptor application 110 may identify the IoT module by sending an identification query to the IoT module requesting that the IoT module provide identification information. In turn, the IoT module may return the identification information to the IoT module adaptor application 110. In other instances, the IoT module may automatically send its identification information to the IoT module adaptor application 110 when the IoT device 104 initially provides power to the IoT module.

At block 506, the IoT module adaptor application 110 may determine a specific combination of at least one of one or more AT commands or one or more APIs as stored in the software library 112 of the IoT module adaptor application 110 that corresponds to the identity of the IoT module. In various embodiments, the IoT module adaptor application 110 may use the device database 120 to correlate the identification information to the specific combination.

At block 508, the IoT module adaptor application 110 may provide the device application of the IoT device with access to the specific combination for the device application to interact with the IoT module. For example, the IoT module adaptor application 110 may retrieve the specific combination of the one or more AT commands and/or the one or more APIs from the software library 112. Subsequently, the IoT module adaptor application 110 may load the specific combination, or one or more pointers corresponding to the specific combination, into a designated directory, file, or memory location for access by the device application 108. Accordingly, the device application 108 may use the specific combination to command the IoT module to perform network connectivity activities that include sending data and receiving data.

FIG. 6 is a flow diagram of an example process 600 for providing a device application installed on an IoT device with access to a detected IoT module when an existing IoT module connected to the IoT module is replaced with the detected IoT module. At block 602, the IoT module adaptor application 110 of the IoT device 104 may detect that a first IoT module is decoupled from the IoT device 104 and a second IoT module is coupled to the IoT device 104. In various embodiments, the IoT module adaptor application 110 may sense the electrical coupling and decoupling of the IoT modules based on changes in electrical current and/or voltage load resulting from the coupling and decoupling.

At block 604, the IoT module adaptor application 110 may ascertain an identity of the second IoT module based on identification information provided by the second IoT module. In some instances, the IoT module adaptor application 110 may identify the second IoT module by sending an identification query to the second IoT module requesting that the second IoT module provide identification information. In turn, the second IoT module may return the identification information to the IoT module adaptor application 110.

At block 606, the IoT module adaptor application 110 may determine a specific combination of at least one of one or more AT commands or one or more APIs as stored in the software library 112 of the IoT module adaptor application 110 that corresponds to the identity of the second IoT module. In various embodiments, the IoT module adaptor application 110 may use the device database 120 to correlate the identification information to the specific combination.

At block 608, the IoT module adaptor application 110 may provide the device application of the IoT device with access to the specific combination for the device application to interact with the second IoT module. For example, the IoT module adaptor application 110 may retrieve the specific combination of the one or more AT commands and/or the one or more APIs from the software library 112. Subsequently, the IoT module adaptor application 110 may load the specific combination, or one or more pointers corresponding to the specific combination, into a designated directory, file, or memory location for access by the device application 108. Accordingly, the device application 108 may use the specific combination to command the IoT module to perform network connectivity activities that include sending data and receiving data.

FIG. 7 is a flow diagram of an example process 700 for a software library of an IoT module adaptor application to be updated by an update service. At block 702, the IoT module adaptor application 110 of an IoT device 104 may receive an update package of at least one of one or more new AT commands or one or more new APIs for an IoT module. In various embodiments, an update service 302 of an IoT device manufacturer or multiple device manufacturers may use the network 314 to transmit the update package as an OTA update to the IoT device 104 via SCP, SFTP, HTTPS, and/or so forth.

At block 704, the IoT module adaptor application 110 may determine whether the update package is for a new IoT module that is unknown to the IoT module adaptor application 110, or an existing IoT module that is known to the IoT module adaptor application 110. Accordingly, at decision block 706, if the IoT module adaptor application 110 determines that the update package is for a new IoT module, the process 700 may proceed to block 708. At block 708, the IoT module adaptor application 110 may store the update package of at least one of one or more new AT commands or one or more new APIs for the new IoT module in the software library 112 of the IoT module adaptor application 110.

However, if the IoT module adaptor application 110 determines that the update package is for a new IoT module at decision block 706, the process 700 may proceed to block 710. At block 710, the IoT module adaptor application 110 may replace at least one of one or more existing AT commands or one or more existing APIs for the existing IoT module as stored in the software library 112. Such data can be replaced with of at least one of one or more new AT commands or one or more new APIs from the update package.

The use of an IoT module adaptor application to provide operational compatibility between a device application of an IoT device and multiple IoT modules may offer multiple benefits. The benefits may include interoperability for changing the IoT modules that are used by IoT devices, quicker adoption of new IoT module solutions when new IoT modules, standards, or specifications are put forth, and reduction of the time to market of new IoT modules.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an Internet of things (IoT) device storing computer-executable instructions that upon execution cause one or more processors to perform actions comprising:
   detecting that an IoT module is connected to the IoT device via mating electrical interface connectors that electrically couple the IoT module to the IoT device, the IoT module being one of multiple IoT modules configured to provide network connectivity functionalities to the IoT device;
   ascertaining an identity of the IoT module of the multiple IoT modules based on corresponding identification information provided by the IoT module to the IoT device following connection of the IoT module to the IoT device via the mating electrical interface connectors;
   determining a specific combination of at least one of one or more ATtention (AT) commands or one or more application program interfaces (APIs) as stored in a software library of the IoT device that corresponds to the identity of the IoT module; and
   providing a device application of the IoT device with access to the specific combination of at least one of one or more AT commands or one or more APIs for the device application of the IoT device to interact with the IoT module by loading a corresponding pointer for at least one of each of the one or more AT commands or each of the one or more APIs into a memory location in a memory of the IoT device that is accessible to the device application.

2. The one or more non-transitory computer-readable media of claim 1, wherein the detecting includes detecting that the IoT module is connected to the IoT device following an electrical decoupling of an additional IoT module of the multiple IoT modules from the IoT device and an electrical coupling of the IoT module of the multiple IoT modules to the IoT device.

3. The one or more non-transitory computer-readable media of claim 1, wherein the ascertaining includes:
   sending an identification query from the IoT device to the IoT module requesting that the IoT module provide the identification information; and receiving, at the IoT device, the identification information from the IoT module in response to the identification query.

4. The one or more non-transitory computer-readable media of claim 1, wherein the identification information is automatically sent by the IoT module to the IoT device following the IoT device providing power to the IoT module.

5. The one or more non-transitory computer-readable media of claim 1, wherein the identification information includes one or more of a unique identifier of the IoT module, an identity of a manufacturer of the IoT module, a device model of the IoT module, or a version number of the IoT module.

6. The one or more non-transitory computer-readable media of claim 5, wherein the unique identifier includes a media access control (MAC) address, an integrated circuit card identifier (ICCID), or an electronic serial number (ESN).

7. The one or more non-transitory computer-readable media of claim 1, wherein the determining includes determining the specific combination in response to the identification information indicating that the IoT module is not a previous IoT module that is electrically coupled to the IoT device or that the IoT module is different in module type from the previous IoT module.

8. The one or more non-transitory computer-readable media of claim 1, wherein the determining includes determining the specific combination based on a device database of the IoT device, the device database including entries that match individual IoT modules of different module types to corresponding combinations of at least one of one or more specific AT commands or one or more specific APIs.

9. The one or more non-transitory computer-readable media of claim 1, wherein the actions further comprise:
receiving an update package of at least one of one or more new AT commands or one or more new APIs from a backend service;
in response to the update package being for a new IoT module, storing the update package of at least one of the one or more new AT commands or the one or more new APIs in the software library of the IoT device; and
in response to the update package being for an existing IoT module known in a device database of the IoT device, replacing at least one of one or more existing AT commands or one or more existing APIs for the existing IoT module as stored in the software library of the IoT device with at least one of the one or more new AT commands or the one or more new APIs from the update package,
wherein the new IoT module has identification information that is unknown in the device database of the IoT device or the identification information of the new IoT module is not correlated with any combination of at least one of one or more specific AT commands or one or more specific APIs.

10. The one or more non-transitory computer-readable media of claim 9, wherein the receiving includes receiving the update package in response to querying the backend service for at least one of the one or more new AT commands or the one or more new APIs for a particular IoT module, or receiving the update package in response to the backend service determining that at least one of the one or more new AT commands or the one or more new APIs is available to the software library of the IoT device.

11. The one or more non-transitory computer-readable media of claim 9, wherein the receiving includes receiving the update package from the backend service via Secure Copy Protocol (SCP) transfer, Secure File Transfer Protocol (SFTP) transfer, or HTTP Secure (HTTPS) transfer.

12. A computer-implemented method, comprising:
detecting, via an Internet of things (IoT) module adaptor application of an IoT device, that an IoT module is electrically connected to the IoT device via mating electrical interface connectors, the IoT module being one of multiple IoT modules configured to provide network connectivity functionalities to the IoT device;
ascertaining, via the IoT module adaptor application of the IoT device, an identity of the IoT module of the multiple IoT modules based on corresponding identification information provided by the IoT module following connection of the IoT module to the IoT device via the mating electrical interface connectors;
determining, via the IoT module adaptor application of the IoT device, a specific combination of at least one of one or more ATtention (AT) commands or one or more application program interfaces (APIs) as stored in a software library of the IoT module adaptor application that corresponds to the identity of the IoT module; and
providing, via the IoT module adaptor application of the IoT device, a device application of the IoT device with access to the specific combination of at least one of one or more AT commands or one or more APIs for the device application to interact with the IoT module by loading a corresponding pointer for at least one of each of the one or more AT commands or each of the one or more APIs into a memory location in a memory of the IoT device that is accessible to the device application.

13. The computer-implemented method of claim 12, wherein the detecting includes detecting that the IoT module is connected to the IoT device following an electrical decoupling of an additional IoT module of the multiple IOT modules from the IoT device and an electrical coupling of the IoT module of the multiple IoT modules to the IoT device.

14. The computer-implemented method of claim 12, wherein the ascertaining includes:
sending an identification query from the IoT module adaptor application to the IoT module requesting that the IoT module provide the identification information; and
receiving, at the IoT module adaptor application, the identification information from the IoT module in response to the identification query.

15. The computer-implemented method of claim 12, wherein the identification information is automatically sent by the IoT module to the IoT module adaptor application of the IoT device following the IoT device providing power to the IoT module.

16. The computer-implemented method of claim 12, wherein the identification information includes one or more of a unique identifier of the IoT module, an identity of a manufacturer of the IoT module, a device model of the IoT module, or a version number of the IoT module.

17. The computer-implemented method of claim 12, wherein the determining includes determining the specific combination in response to the identification information indicating that the IoT module is not a previous IoT module that is electrically coupled to the IoT device or that the IoT module is different in module type from the previous IoT module.

18. An Internet of things (IoT) device, comprising:
one or more processors; and
memory including a plurality of computer-executable components that are executable by the one or more processors to perform a plurality of acts, the plurality of acts comprising:
   detecting that an IoT module is connected to the IoT device via mating electronical interface connectors that electrically couple the IoT module to the IoT device, the IoT module being one of multiple IoT modules configured to provide a network connectivity functionality to the IoT device;
   receiving corresponding identification information provided by the IoT module following connection of the IoT module to the IoT device via the mating electrical interface connectors;
   determining that the IoT module is unknown to the IoT device when the corresponding identification information of the IoT module is not found in a device database of the IoT device;
   in response to the IoT module being unknown to the IoT device, requesting a specific combination of one or more ATtention (AT) commands and one or more application program interfaces (APIs) that correspond to the identification information of the IoT module from a backend service provided by a manufacturer of the IoT device;
   receiving, in response to the request, the specific combination of the one or more AT commands and the one or more APIs from the backend service provided by the manufacturer of the IoT device; and
   providing a device application of the IoT device with access to the specific combination of the one or more AT commands and the one or more APIs for the device application of the IoT device to interact with the IoT module.

19. The IoT device of claim 18, wherein the acts further comprise:
   receiving an update package of at least one of one or more new AT commands or one or more new APIs from the backend service;
   in response to the update package being for a new IoT module, storing the update package of at least one of the one or more new AT commands or the one or more new APIs in a software library of the IoT device; and
   in response to the update package being for an existing IoT module known in a device database of the IoT device, replacing at least one of one or more existing AT commands or one or more existing APIs for the existing IoT module as stored in the software library of the IoT device with at least one of the one or more new AT commands or the one or more new APIs from the update package,
   wherein the new IoT module has identification information that is unknown in the device database of the IoT device or the identification information of the new IoT module is not correlated with any combination of at least one of one or more specific AT commands or one or more specific APIs.

20. The IoT device of claim 19, wherein the receiving includes receiving the update package in response to querying the backend service for at least one of the one or more new AT commands or the one or more new APIs for a particular IoT module, or receiving the update package in response to the backend service determining that at least one of the one or more new AT commands or the one or more new APIs is available to the software library of the IoT device.

* * * * *